United States Patent [19]

Kanamaru

[11] Patent Number: 5,634,852
[45] Date of Patent: Jun. 3, 1997

[54] UNIFORM SPEED JOINT AND AXIAL PISTON PUMP USING THE JOINT

[75] Inventor: Hisanobu Kanamaru, Hitachinaka, Japan

[73] Assignee: Hitachi, Ltd., Japan

[21] Appl. No.: 396,432

[22] Filed: Feb. 28, 1995

[30] Foreign Application Priority Data

Feb. 28, 1994 [JP] Japan .................. 6-029271

[51] Int. Cl.$^6$ .................................................. F16D 3/48
[52] U.S. Cl. .................................................. 464/138
[58] Field of Search ................... 92/71; 464/137, 464/138, 50, 904, 106

[56] References Cited

U.S. PATENT DOCUMENTS

| | | | |
|---|---|---|---|
| 981,736 | 1/1911 | Zock | 464/138 |
| 2,784,576 | 3/1957 | Weir | 464/138 |
| 3,823,576 | 7/1974 | Colletti et al. | 464/138 X |
| 4,771,676 | 9/1988 | Matsumoto et al. | 92/71 X |
| 4,894,045 | 1/1990 | Kanamaru et al. | 464/138 |
| 5,035,677 | 7/1991 | Kanamaru et al. | 464/138 |
| 5,056,416 | 10/1991 | Ota et al. | 92/71 X |
| 5,070,765 | 12/1991 | Parsons | 92/71 |
| 5,129,797 | 7/1992 | Kanamaru | 464/138 X |
| 5,490,767 | 2/1996 | Kanou et al. | 92/71 X |

FOREIGN PATENT DOCUMENTS

| | | | |
|---|---|---|---|
| 626377 | 2/1936 | Germany | 464/138 |
| 57-190143 | 11/1982 | Japan | 464/137 |
| 61-241530 | 10/1986 | Japan | 464/137 |
| 63-13921 | 1/1988 | Japan | 464/137 |
| 63-308220 | 12/1988 | Japan . | |
| 3-125021 | 5/1991 | Japan | 464/138 |
| 4-72072 | 11/1992 | Japan . | |
| 5-263759 | 10/1993 | Japan . | |

*Primary Examiner*—Daniel P. Stodola
*Assistant Examiner*—Eileen A. Dunn

[57] ABSTRACT

A uniform speed joint has three or more drive pins one side ends of which are concentrically arranged in one side face of either one of a driving member and driven member, and the other ends of the drive pins are rotatably and slidably arranged in one side face of the other member and supported through ball bearings the periphery of which is restricted and supported. An axial piston pump is constructed by application of the uniform speed joint.

8 Claims, 3 Drawing Sheets

UNIFORM SPEED JOINT AND AXIAL PISTON PUMP USING THE JOINT

BACKGROUND OF THE INVENTION

The present invention relates to a uniform speed joint and an axial piston pump using the joint and, more particularly, to a uniform speed joint suitable for connecting a driving member and a driven member at highly precisely uniform speed and an axial piston pump using the joint.

Universal joints in each of which a driving member and a driven member are connected through drive pins the ends of which are fixed to the driving member and the other ends of the drive pines are slidably inserted in spherical bearings the circumference of which are engaged with the driven member were invented by inventors including the inventor of the present application, which universal joints are known in JP A 63-308220 or JP B 4-72072, for instance.

Further, an invention by which the prior arts are improved further and uniformity in speed of a joint portion is improved was made by inventors including the inventor of the present application, which invention is known in JP A 5-263759. In this invention, drive pins are slidably inserted in a driving member, spherical head portions each are made in one piece with the drive pin, and a universal joint is constructed by engaging them with a driven member.

The former universal joint is constructed so that a pitch circle difference of drive pins changing in position according to change in inclination angle between the driving member and the driven member is absorbed. However, since the driving member and driven member are connected by a pair of the drive pins, speed change takes place twice per one revolution. Therefore, the speed becomes nearly uniform, but it has deficiency that the rotation can not be transmitted at precisely uniform speed. Accordingly, problems such as mechanical vibrations or rotation noises are not solved.

In the latter universal joint, since bending stress necessary to transmit rotation is applied to the drive pins, slide resistance is large and, in particular, it becomes rotation load at high speed rotation whereby a follow-up property becomes bad. Therefore, in this case, also, even if rotation becomes uniform, problems such as mechanical vibrations and rotation noises are not solved.

SUMMARY OF THE INVENTION

An object of the present invention is to provide a uniform speed joint which is excellent in uniformity in speed less in mechanical vibrations or noises, which construction is simple.

Another object of the present invention is to provide an axial piston pump using a uniform speed joint which is high availability factor and made simply and easily.

One of the present invention resides in a uniform speed joint having drive pins arranged between a driving member and driven member and mechanically connecting the driving member and the driven member, characterized in that said drive pins are three or more, ends of drive pins are concentrically arranged and fixed in one side face of one of the driving member and the driven member; the other ends of said drive pins are rotatably and slidably arranged and supported in the other member through ball bearings the periphery of each of which is restricted and supported.

Another of the present invention resides in an axial piston pump comprising a cylinder barrel accommodated in a housing and rotating together with a drive shaft, an inclined disc fixedly arranged in an inner surface of the housing and receiving axial force, and a piston device arranged between the inclined disc and the cylinder barrel, and transmitting rotational force of the cylinder barrel to the inclined disc, characterized in that the cylinder barrel is concentrically with the drive shaft, and fixes three or more drive pins arranged at equidistance at a more inner side than an axis of the piston device; the other end of each drive pin is arranged rotatably and slidably in the inclined disc, and supportedly passes through the inclined disc through a ball bearing the periphery of which is restricted and supported.

A driving member 1 and a driven member 4 are connected through a plurality of pins 3, axes A and B of respective members cross at an angle α (160°) at a central point of a guide pin 2 and rotate. A straight line C connecting the centers of bearings 5 disposed at symmetrical position is positioned on a plane dividing equiangularly the cross angle α into two, and the bearings 5 are self-aligned and held on the line.

Combined with the uniform speed construction, another end of each drive pin slidably moves the bearing and transmits rotation to the driven member as the drive shaft rotates.

Therefore, even if bending stress necessary to transmit rotation is applied on the drive pins, the ball bearings can smoothly move axially.

DETAILED DESCRIPTION OF EMBODIMENT OF THE INVENTION

Figure 1:
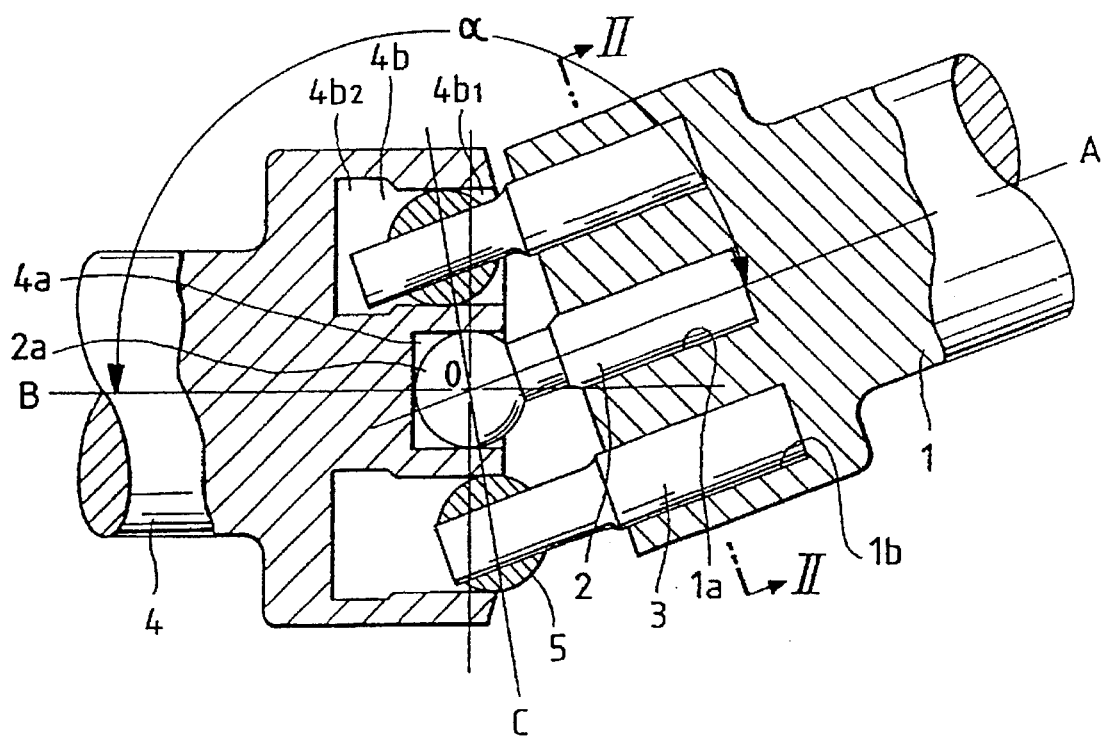
FIG. 1 is a partial sectional front view of a uniform speed joint of an embodiment of the present invention.
Figure 2:
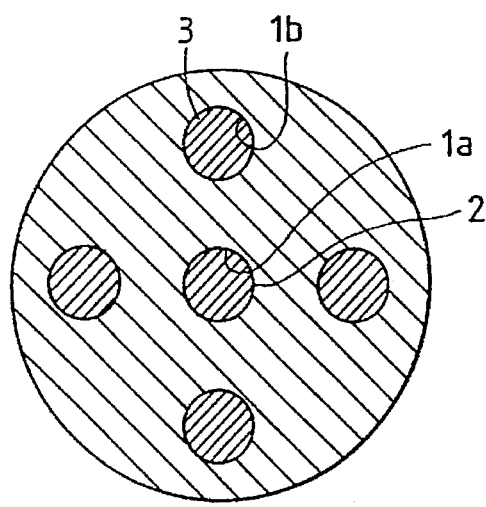
FIG. 2 is a sectional view taken along a line II—II in FIG. 1.
Figure 3:
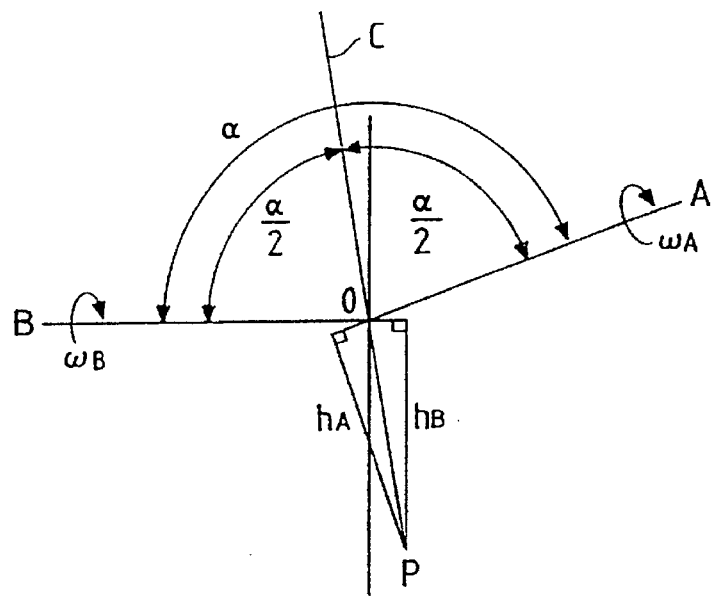
FIG. 3 is a diagram showing a geometrical relation of the uniform speed joint in FIG. 1.

An embodiment of the present invention is described hereunder referring to FIGS. 1 to 3.

A driving member 1 (driving shaft) connected to a driving source such as a separately arranged motor, etc. is formed to be columnar by cold forging formation or machining, and a mounting hole 1a for a guide pin 2 which extends in parallel to an axis of the driving member 1 is formed in a central portion of one side face thereof. Further, four mounting holes 1b for drive pins 3 which extend in parallel with the mounting hole 1a are formed concentrically with the mounting hole 1a and at equidistance as shown in FIG. 2, the drive pins each are fixed thereto by press-fit. However, any fixing such as welding, plastic deformation joining, etc. can be applied as long as it can fix them strongly. A driven member (driven shaft) 4 arranged opposite the driving member 1 at any inclination angle is formed in the same manner as mentioned above, a hole 4a for arranging the guide pin 2 and holes 4b for arranging the drive pins 3 are formed in a face opposite to the mounting holes 1a, 1b. The guide pin arranging hole 4a is made into a concave having such a scale that a ball head 2a can move freely therein. Further, as the receiving face shape, hemi-spherical shape can be used therefor. On the other hand, the driving pin arranging holes 4b are insertion holes 4b1 for the bearings 5 which are described hereunder in detail and drive pin escaping holes 4b2 which are formed to communicate with the holes 4b1 and the diameter of each of which is larger than a diameter of each of the holes 4b1.

The above-mentioned bearings 5 each are a hard ball made of tool steel, etc. and slidably mounted on a tip portion of the drive pin 3.

Here, the driving member 1 and the driven member 4 are connected through a plurality of the pins 3, the respective axes A and B cross at a central point 0 of the guide pin 2 at an angle $\alpha$ (160°), a straight line C connecting the centers of the bearings disposed symmetrically is positioned on a plane dividing equiangularly the cross angle $\alpha$ into two, and the bearings 5 are self-aligned on the line and held thereon.

In FIG. 3, considering geometrical relations of the axes A, B, C, a point P is a center of the bearing 5, which point is a power transmitting point. Here, assuming that distances of the point P from the axes A, B are $h_A$ and $h_B$, respectively, a straight line C connecting the point P and the point 0 divides equiangularly the cross angle $\alpha$ into two angles, so that $h_A = h_B$. Further, assuming that angular velocities of the axis A of the driving member 1 and the axis B of the driven member 4 are $\omega_A$, $\omega_B$, respectively, peripheral velocities of both axes around the point P are $\omega_A \times h_A$, $\omega_B \times h_B$, respectively. Here, since the point P is unchangeable in its position, these peripheral velocities are equal to each other, that is, $\omega_A \times h_A = \omega_B \times h_B$. Accordingly, $\omega_A = \omega_B$, so that the power transmitting point P is always positioned on a plane dividing equiangularly the cross angle $\alpha$ into two, whereby uniform speed rotation transmission between the driving member 1 and the driven member 4 can be effected.

In the above-mentioned embodiment, the guide pin 2 is provided between the driving member 1 and the driven member 4, however, if the joint is constructed so that distance between the driving member 1 and the driven member 4 is properly kept to a predetermined distance, the guide pin 2 can be omitted, that is, in such a case, the guide pin 2 is unnecessary. It is better to protect the joint portion from dusts by providing a cover, if necessary.

According to the embodiment of the present invention, combined with the construction of uniform speed, since the drive pins are fixed to either one of the driving member and the driven member, and the ball bearings are slidably arranged on the other ends of the drive pins and connected to the other member through the ball bearings, the drive pins slide the ball bearings according to rotational position of the drive shaft. Accordingly, even if bending stress necessary to transmit the rotation is applied to the drive pins, the ball bearings can move axially smoothly, and particularly, a high follow-up property can be attained at high speed rotation. Such a problem as mechanical vibrations, rotation noises can be solved, and a practical uniform speed joint can be provided with a simple construction.

Figure 4:
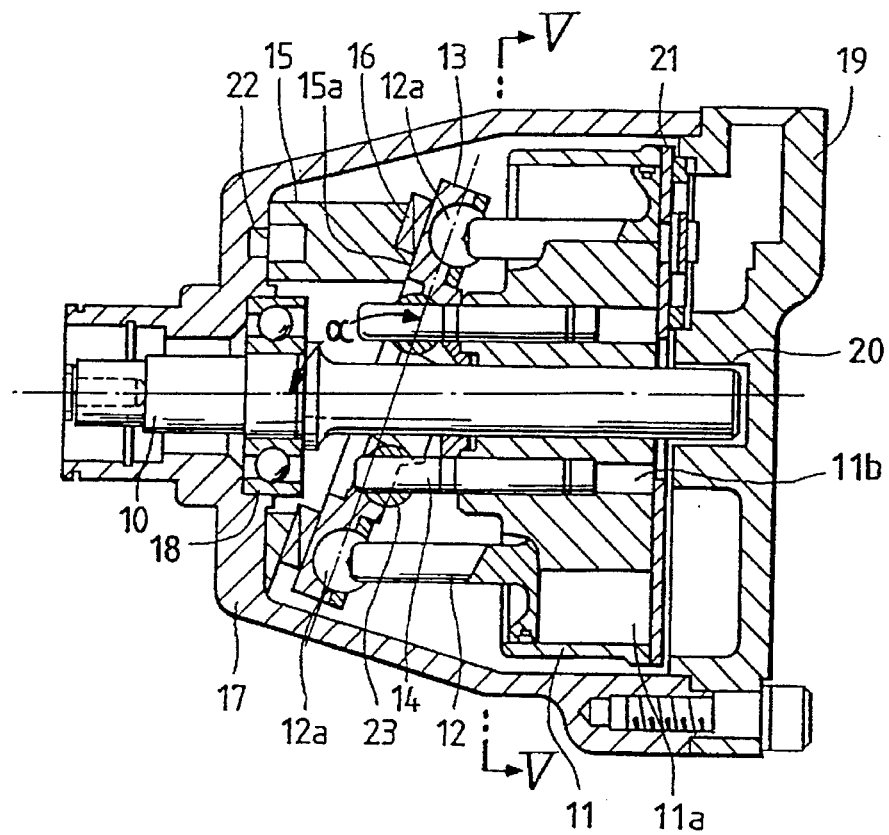
FIG. 4 is a sectional view of an axial piston pump using the uniform speed joint of the present invention.
Figure 5:
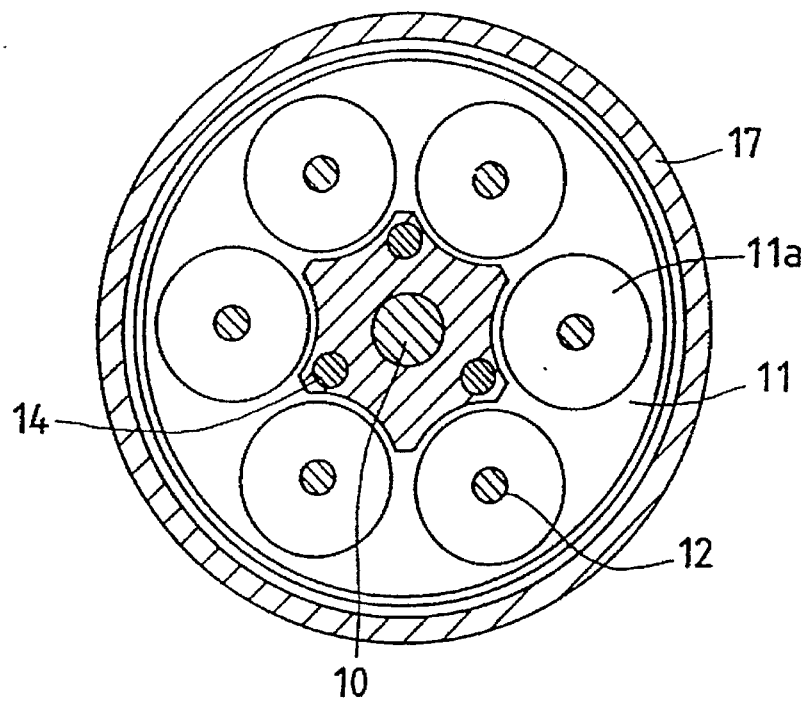
FIG. 5 is a sectional view of FIG. 4.
Figure 6:
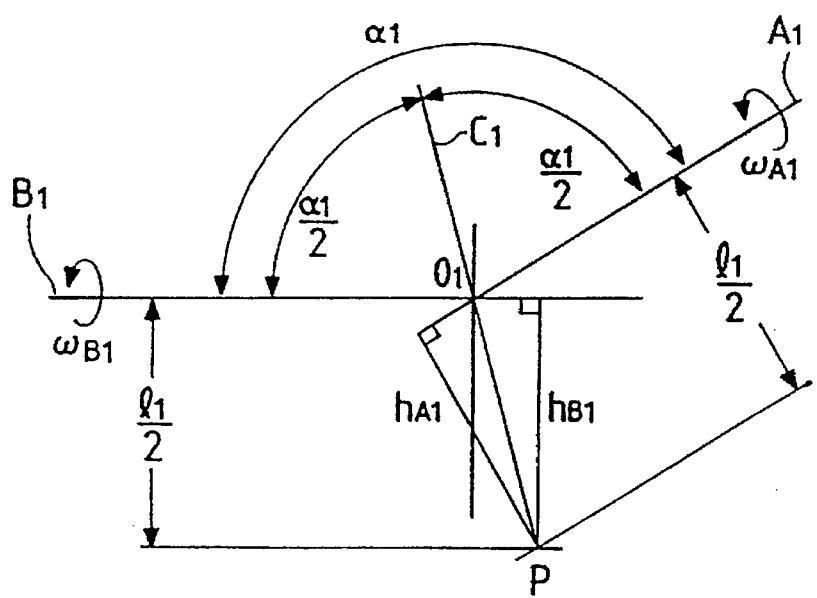
FIG. 6 is a diagram showing a geometrical relation of a joint mechanism in FIG. 4.

Next, an axial piston pump apparatus of application of the above-mentioned uniform speed joint is explained, referring to FIGS. 4 to 6.

In Figures, the piston pump apparatus comprises a drive shaft 10, a cylinder barrel 11 rotating together with the drive shaft 10, pistons 12 reciprocating in cylinder bores 11a formed in the cylinder barrel 11, a piston support 13 rotating together with the pistons 12 and converting the rotational motion into reciprocating motion of the pistons 12, drive pins 14 transmitting the rotation of the cylinder barrel 11 to the piston support 13, and a fixed swash plate 15 supporting, through a thrust bearing 16, the piston support 13 positioned at an inclination angle $\alpha$ to the drive shaft 10.

One end of the driving shaft 10 is supported to a housing 17 through a roller bearing 18. Further, the other end of the driving shaft 10 is supported to a side cover 19 through a bearing 20, and the cylinder barrel 11 is axially fixedly arranged through a valve plate 21.

A plurality of the pistons 12 are inserted in the cylinder bores 11a, and the head ball portions 12a of the pistons 12 are connected and held to the piston support 13 which is supported by a central portion of the driving shaft 10.

The fixed swash plate 15 is a cylindrical body positioned on the back of the piston support 13, and an outer end portion 15a of the plate is annular and inclined at the inclination angle $\alpha$ to the drive shaft 10, and fixed by pins or others (not shown) after its position is positioned by using positioning pins 22.

The drive pins 14 are arranged concentrically at an inner side of the pistons 12. An end of each drive pin 14 is pressed in and fixed to a drive pin insertion hole 11b formed in the cylinder barrel 11, and the other end thereof is rotatably inserted in a ball receiving hole 23 formed in an end face of the piston support 13 through a ball bearing 23.

The piston pump apparatus has an above-mentioned construction, which sectional view taken along a line V—V is shown in FIG. 5. As shown in the figure, the drive pins 14 at an inner side and the pistons 12 at an outer side are concentrically arranged around the drive shaft 10.

In the piston pump apparatus, as the drive shaft 10 rotates, the cylinder barrel 11 rotates, and the rotational force is transmitted through the drive pins 14 to drive rotation of the piston support 13. Accordingly, the pistons 12 are reciprocated by the rotation to generate discharge pressure.

Uniformity in speed of the swash type pump apparatus is explained, referring to FIG. 4 and FIG. 6. In FIG. 6, assuming that an axis of the drive shaft 10 is a drive axis $A_1$, and an axis of the cylinder support 13 is a driven axis $B_1$, the drive axis $A_1$ and the driven axis $B_1$ cross at a cross angle $\alpha_1$. Since an inclination angle of the annular portion 15a of the fixed swash plate 15 opposing the piston support 13 is $\alpha_1/2$, an inclination angle of a plane $C_1$ to the drive axis $A_1$, which plane includes therein a straight line connecting the centers of the ball bearings 23 of two of the drive pins 14, becomes $\alpha_1/2$. That is, as in the previous embodiment, a power transmitting point is always on the plane dividing equally the cross angle $\alpha_1$ between the drive axis $A_1$ and the driven axis $B_1$ into two, conditions of uniformity in speed is satisfied. Therefore, rotation of the drive axis $A_1$ is transmitted to the driven axis $B_1$ at uniform speed, whereby transmission of rotation between the drive shaft 10 and the pistons 12 is effected at uniform speed. Further, since the inclination angle $\alpha_1/2$ is fixed at the fixed swash plate 15, uniform speed transmission is surely achieved. That is, synchronous rotation can be achieved without applying any outer force to the piston portions which influences performance of the pump. Further, as for the fixed swash plate 15, any member can be selected from prepared several members having different inclination angles according to a discharge amount, if a relation between the annular portion 15a and the plane $C_1$ including a straight line connecting the centers of the ball bearings 23 satisfies the previously mentioned relation of $\alpha_1$ and $\alpha_1/2$.

According to the embodiment of the present invention, combined with the construction of uniform speed, since the drive pins are fixed to one side of the cylinder barrel, and the ball bearings are slidably arranged on the other ends of the drive pins and connected to the piston support through the ball bearings, the drive pins slide the ball bearings according to rotational position of the cylinder barrel. Accordingly, even if bending stress necessary to transmit the rotation, the ball bearings can move axially smoothly, and particularly, a high follow-up property can be attained at high speed rotation. The axial piston pump using a uniform speed joint which is less in mechanical vibrations, and rotation noises can be provided.

According to the present invention, a uniform speed joint which is excellent in uniformity of speed, and less in mechanical vibrations and noises can be provided.

Further, according to the present invention, an axial piston pump which is high in availability factor and uses a uniform speed joint can be provided easily.

What is claimed is:

1. A uniform speed joint comprising:

first and second rotatable members arranged end to end with a distance therebetween and each having a rotating axis;

ball bearings each having a through hole therein and axially slidably and rotatably held by said second rotatable member;

at least three drive pins arranged concentrically with and in parallel to the rotating axis of said first rotatable member, one end portion of said at least three pins being fixed to said first rotatable member and the other end portion of said at least three pins being axially slidably inserted in said through holes of said ball bearings, respectively, so as to permit relative movement of said ball bearings with respect to said first and second rotatable members.

2. A uniform speed joint according to claim 1, wherein said end of each of said drive pins is press-fitted in and fixed to said first rotatable member.

3. A uniform speed joint according to claim 1, wherein said axes of said first and second rotatable members cross each other at a center at an angle, and a straight line connecting centers of the ball bearings disposed symmetrically is positioned on a plane dividing equiangularly said angle into two.

4. A uniform speed joint, comprising:

first and second rotatable members arranged end to end with a distance therebetween and each having a rotating axis, said second rotatable member having at least three holes formed concentrically with the rotating axis and extending axially;

ball bearings having through holes and axially slidably and rotatably inserted in said holes of said second rotatable member, respectively;

at least three drive pins arranged in parallel to the rotating axis of said first rotatable member, one end portion of said at least three pins being fixed to said first rotatable member and the other end portion of said at least three pins being axially slidably inserted in said through holes of said ball bearings, respectively, whereby rotation is transmitted between said first and second rotatable members through said pins and said ball bearings.

5. A uniform speed joint according to claim 4, wherein said holes of said second rotatable member each has a drive pin arranging hole portion and a larger diameter hold portion, said ball bearings each being disposed in said pin arranging hole portion, and said larger diameter hole portion being larger in diameter than said pin arranging hole portion.

6. A uniform speed joint, comprising:

first and second rotatable members arranged end to end with a distance therebetween and each having a rotating axis;

ball bearings each having a through hole therein and axially slidably and rotatably held by said second rotatable member;

a guide pin for guiding said first and second rotatable members, one end portion of said guide pin being disposed along the rotating axis of said first rotating member and mounted on said first rotatable member and the other end formed in spherical shape and rotatably supported by said second rotatable member at the axis of said second rotatable member;

at least three drive pins arranged concentrically with and in parallel to the rotating axis of said first rotatable member, one end portion of said at least three pins being fixed to said first rotatable member and the other end portion of said at least three pins being axially slidably inserted in said through holes of said ball bearings, respectively, whereby rotation is transmitted between said first and second rotatable member through said pins and said ball bearings.

7. A uniform speed joint according to claim 6, wherein said end portion of each of said drive pins is press-fitted in and fixed to said first rotatable member.

8. A uniform speed joint according to claim 6, wherein said axes of said first and second rotatable members cross each other at a center at an angle, and a straight line connecting centers of the ball bearings disposed symmetrically is positioned on a plane dividing equiangularly said angle into two.

* * * * *